(12) United States Patent
Malewicz et al.

(10) Patent No.: US 9,026,850 B1
(45) Date of Patent: May 5, 2015

(54) CONFINED RECOVERY IN A DISTRIBUTED COMPUTING SYSTEM

(75) Inventors: Grzegorz Malewicz, Tokyo (JP); Matthew H. Austern, Palo Alto, CA (US); James C. Dehnert, Palo Alto, CA (US); Aart J. C. Bik, Union City, CA (US); Grzegorz Czajkowski, Redwood City, CA (US)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 13/451,450

(22) Filed: Apr. 19, 2012

Related U.S. Application Data

(60) Provisional application No. 61/477,559, filed on Apr. 20, 2011, provisional application No. 61/483,183, filed on May 6, 2011.

(51) Int. Cl.
*G06F 11/00* (2006.01)
*G06F 9/45* (2006.01)

(52) U.S. Cl.
CPC .................................... *G06F 8/457* (2013.01)

(58) Field of Classification Search
CPC ............ G06F 11/1446; G06F 11/1471; G06F 11/202; G06F 11/2046
See application file for complete search history.

(56) References Cited

U.S. PATENT DOCUMENTS

| | | | | |
|---|---|---|---|---|
| 4,665,520 | A * | 5/1987 | Strom et al. | 714/15 |
| 5,440,726 | A * | 8/1995 | Fuchs et al. | 714/20 |
| 5,734,833 | A | 3/1998 | Chiu et al. | |
| 6,393,583 | B1 * | 5/2002 | Meth et al. | 714/12 |
| 6,823,474 | B2 * | 11/2004 | Kampe et al. | 714/13 |
| 7,392,258 | B2 | 6/2008 | Bogner et al. | |
| 8,250,405 | B2 * | 8/2012 | Elnozahy | 714/13 |
| 8,429,110 | B2 | 4/2013 | Cai et al. | |
| 8,433,951 | B1 * | 4/2013 | Havemose et al. | 714/15 |
| 8,458,229 | B2 | 6/2013 | Oliver et al. | |
| 8,566,326 | B2 * | 10/2013 | Hu et al. | 707/745 |
| 8,880,931 | B2 * | 11/2014 | Sun | 714/4.1 |
| 2006/0212860 | A1 | 9/2006 | Benedikt et al. | |
| 2007/0277056 | A1 * | 11/2007 | Varadarajan et al. | 714/15 |
| 2008/0216077 | A1 | 9/2008 | Emani et al. | |

(Continued)

OTHER PUBLICATIONS

Kang, F., et al., "Correlated Label Propagation with Application to Multi-label Learning," Proceedings of the 2006 IEEE Computer Society Conference on Computer Vision and Pattern Recognition (CVPR'06), 2006, pp. 1719-1726.

(Continued)

*Primary Examiner* — Michael Maskulinski
(74) *Attorney, Agent, or Firm* — Fish & Richardson P.C.

(57) ABSTRACT

Executing a confined recovery in a distributed system having a plurality of worker systems including a failed worker system at a current superstep. The confined recovery includes determining states of the partitions of the worker systems during the supersteps preceding the current superstep, and determining a recovery initiation superstep preceding the current superstep in which all messages for recovery initiation superstep are available. The recovery initiation superstep is determined responsive to determining the states of the partitions. Additionally, a recovery set of partitions is determined for which messages in supersteps after the recovery initiation superstep are not available. The worker systems having the partitions in the recovery set are instructed to execute the defined function for the partitions in the recovery set starting at the recovery initiation superstep to recover the lost exchanged messages.

17 Claims, 10 Drawing Sheets

(56) References Cited

U.S. PATENT DOCUMENTS

| | | |
|---|---|---|
| 2008/0271022 A1 | 10/2008 | Strassner et al. |
| 2009/0055343 A1 | 2/2009 | Van Lunteren |
| 2010/0017537 A1 | 1/2010 | Linnartz et al. |
| 2011/0307436 A1 | 12/2011 | Cai et al. |
| 2011/0314075 A1 | 12/2011 | Boldyrev et al. |

OTHER PUBLICATIONS

Rao, D., et al., "Ranking and Semi-supervised Classification on Large Scale Graphs Using Map-Reduce," Proceedings of the 2009 Workshop on Graph-based Methods of Natural Language Processing, ACL-IJCNLP 2009, pp. 58-65.
Anderson, T., et al., "High-Speed Switch Scheduling for Local-Area Networks," *ACM Trans. Comp. Syst.* 11(4): 319-352, 1993.
Bader, D., et al., "Designing Multithreaded Algorithms for Breadth-First Search and st-connectivity on the Cray MTA-2," in *Proc. 35th Intl. Conf. on Parallel Processing* (ICPP'06), Columbus, Ohio, Aug. 2006, pp. 523-530.
Barroso, L., et al., "Web search for a planet: The Google Cluster Architecture," *IEEE Micro* 23(2):22-28, 2003.
Bayati, M., et al., "Maximum Weight Matching via Max-Product Belief Propagation," in *Proc. IEEE Intl. Symp. on Information Theory*, pp. 1763-1767, 2005.
Bellman, R., "On a routing problem," *Quarterly of Applied Mathematics* 16(1):87-90, 1958.
Bonorden, O., et al., "The Paderborn University BSP (PUB) library," *Parallel Computing* 29:187-207, 2003.
Brin, S., et al., "The Anatomy of a Large-Scale Hypertextual Web Search Engine," in *Proc. 7th Intl. Conf on the World Wide Web*, pp. 107-117, 1998.
Chan, A., et al., "CGMGRAPH/CGMLIB: Implementing and Testing CGM Graph Algorithms on PC Clusters and Shared Memory Machines," *Intl. J. of High Performance Computing Applications* 19(1):81-97, 2005.
Chang, F., et al., "Bigtable: A Distributed Storage System for Structured Data," *ACM Trans. Comp. Syst.* 26(2) Article 4, 26 pages, 2008.
Cherkassky, B., et al., "Shortest paths algorithms: Theory and experimental evaluation," *Mathematical Programming* 73:129-174, 1996.
Cohen, J., "Graph Twiddling in a MapReduce World," *Comp. in Science & Engineering*, pp. 29-41, Jul./Aug. 2009.
Crobak, J., et al., "Advanced Shortest Paths Algorithms on a Massively-Multithreaded Architecture," in *Proc. First Workshop on Multithreaded Architectures and Applications*, pp. 1-8, 2007.
Czajkowski, G., "Large-scale graph computing at Google," Google Research Admin., Jun. 2009, 1 page, [online][retrieved Jul. 20, 2012] retrieved from the internet <http://googleresearch.blogspot.com/2009/06/large-scale-graph-computing-at-google.html>.
Daly, J., "A higher order estimate of the optimum checkpoint interval for restart dumps," *Future Generation Computer Systems* 22:303-312, 2006.
Dean, J., et al., "MapReduce: Simplified Data Processing on Large Clusters," in *Proc. 6th USENIX Symp. On Operating Syst. Design and Impl.*, pp. 137-150, 2004.
Dijkstra, E., et al., "A Note on Two Problems in Connexion with Graphs," *Numerische Mathematik* 1:269-271, 1959.
Erwig, M., "Inductive graphs and functional graph algorithms," *J. Functional Programming* 11(5):467-492, Sep. 2001.
Ghemawat, S., et al., "The Google File System," in *Proc. 19th ACM Symp. On Operating Syst. Principles*, pp. 29-43, 2003.
Google Project Hosting, "Protobuf: Protocol Buffers—Google's data interchange format," 2 pages, [online] [retrieved Jul. 20, 2012] retrieved from the internet <http://code.google.com/p/protobuf/ 2009>.
Goudreau, M., et al., "Portable and Efficient Parallel Computing Using the BSP Model," *IEEE Transactions on Computers* 48(7): 670-689, 1999.
Gregor, D., et al., "Lifting Sequential Graph Algorithms for Distributed-Memory Parallel Computation," in *Proc. Of Parallel Object-Oriented Scientific Computing (POOSC)*, 15 pages, Jul. 2005.
Gregor, D., et al., "The Parallel BGL: A Generic Library for Distributed Graph Computations," in *Proc. 2005 ACM SIGPLAN Conf. on Object-Oriented Prog., Syst., Lang., and Applications (OOPSLA'05)*, pp. 423-437, Oct. 2005.
Hagberg, A., et al., "Exploring Network Structure, Dynamics, and Function using NetworkX," in *Proc. 7th Python in Science Conf.*, pp. 11-15, 2008.
Hill, J., et al., "BSPlib: The BSP programming library," *Parallel Computing* 24:1947-1980, 1998.
Isard, M., et al., "Dryad: Distributed Data-Parallel Programs from Sequential Building Blocks," in *Proc. European Conf. on Computer Syst.*, pp. 59-72, 2007.
Kang, U., et al., "PEGASUS: A Peta-Scale Graph Mining System—Implementation and Observations," in *Proc. Intl. Conf. Data Mining*, pp. 229-238, 2009.
Lumsdaine, A., et al., "Challenges in Parallel Graph Processing," *Parallel Processing Letters* 17:5-20, 2007.
Madduri, K., et al., "A Faster Parallel Algorithm and Efficient Multithreaded Implementations for Evaluation Betweenness Centrality on Massive Datasets," in *Proc. 3rd Workshop on Multithreaded Architectures and Applications (MTAAP'09)* Rome, Italy, May 2009, 8 pages.
Madduri, K., et al., "Parallel Shortest Path Algorithms for Solving Large-Scale Instances," *DIMACS Implementation Challenge—The Shortest Path Problem*, 39 pages, 2006.
Malewicz, G., "A Work-Optimal Deterministic Algorithm for the Certified Write-All Problem with a Nontrivial Number of Asynchronous Processors," *SIAM J. Comput.* 34(4):993-1024, 2005.
Malewicz, G., et al., "Pregel: A System for Large-Scale Graph Processing," in *Comm. ACM SIGMOD/POD*, Indianapolis, Indiana, Jun. 6-10, 2010, 11 pages.
Meyer, U., et al., "Design and Implementation of a Practical I/O-efficient Shortest Paths Algorithm," in *Proc. 3rd Workshop on Multithreaded Architectures and Applications (MTAAP'09)*, Rome, Italy, May 2009, 12 pages.
Meyer, U., et al., "Δ-stepping: a parallelizable shortest path algorithm," *Journal of Algorithms* 49:114-152, 2003.
Munagala, K., et al., "I/O-Complexity of Graph Algorithms," in *Proc. 10th Annual ACM-SIAM Symp. On Discrete Algorithms*, pp. 687-694, 1999.
Olston, C., et al., "Pig Latin: A Not-So-Foreign Language for Data Processing," in *Proc. ACM SIGMOD Intl. Conf. on Management of Data*, pp. 1099-1110, 2008.
Pike, R., et al., "Interpreting the data: Parallel analysis with Sawzall," *Scientific Programming* 13(4):277-298, 2005.
Thorup, M., "Undirected Single-Source Shortest Paths with Positive Integer Weights in Linear Time," *J. ACM* 46(3):362-394, May 1999.
Valiant, L., "A Bridging Model for Parallel Computation," *Comm. ACM* 33(8):103-111, 1990.
Wikipedia, "Bulk synchronous parallel," 3 pages, [online] [retrieved on Mar. 10, 2010] retrieved from the internet <http://en.wikipedia.org/w/index.php?title=Bulk_synchronous_parallel&oldid=349030784>.
Wikipedia, "Distributed computing," 8 pages, [online] [retrieved Mar. 23, 2010] retrieved from the internet <http://en.wikipedia.org/w/index.php?title=Distributed_computing&oldid=351626983>.
Yoo, A., et al., "A Scalable Distributed Parallel Breadth-First Search Algorithm on BlueGene/L," in *Proc. 2005 ACM/IEEE Conf. on Supercomputing (SC'05)*, pp. 25-43, 2005.
Yu, Y., et al., "DryadLINQ: A System for General Purpose Distributed Data-Parallel Computing Using a High-Level Language," in *Proc. 8th USENIX Symp. On Operating Syst. Design and Implementation*, pp. 10-14, 2008.
Ziv, A., et al., "An On-Line Algorithm for Checkpoint Placement," *IEEE Transactions on Computers* 46 (9):976-985, Sep. 1997.

\* cited by examiner

CONFINED RECOVERY IN A DISTRIBUTED COMPUTING SYSTEM

CROSS-REFERENCE TO RELATED APPLICATIONS

This application claims the benefit of U.S. Provisional Application No. 61/477,559, filed Apr. 20, 2011, and U.S. Provisional Application No. 61/483,183, filed May 6, 2011, each of which is hereby incorporated herein by reference.

BACKGROUND

1. Technical Field

This invention pertains in general to distributed computing and in particular to fault tolerance in a distributed computing system.

2. Background Information

In graph processing, a computing problem is represented by a graph having a set of vertices connected by a set of edges. The edges may have associated weights indicating, e.g., a distance represented by the edge or a cost incurred by traversing the edge. The graph can be used to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph and graph processing can analyze the graph to learn about the relationships in the social network. Graphs can also be used to model transportation routes, paths of disease outbreaks, citation relationships among published works, and similarities among different documents.

In a distributed system, different parts of the graph may be processed by different worker systems in a cluster, and some of the worker systems' processing may depend on input received from other worker systems. Accordingly, synchronizing the processing between the cluster's worker system and providing an efficient input delivery system is a challenge. Similarly, providing fault tolerance and recovering from failure of a worker system also presents its own challenges.

SUMMARY

The above and other needs are met by a method, a non-transitory computer-readable storage medium and a system for executing a confined recovery in a distributed computing system having a plurality of worker systems that execute a computation in a plurality of supersteps. During the supersteps, the worker systems execute a defined function for the plurality of partitions and the defined function for a partition exchanges messages with other partitions.

An embodiment of the method for executing the confined recovery comprises identifying a failed worker system from the plurality of worker systems, wherein the failed worker system failed to execute during a current superstep and lost exchanged messages. The method further comprises determining states of the partitions of the worker systems during the supersteps preceding the current superstep, and determining a recovery initiation superstep preceding the current superstep in which all messages for recovery initiation superstep are available. The recovery initiation superstep is determined responsive to determining the states of the partitions. Additionally, the method includes determining a recovery set of partitions for which messages in supersteps after the recovery initiation superstep are not available. The worker systems having the partitions in the recovery set are instructed to execute the defined function for the partitions in the recovery set starting at the recovery initiation superstep to recover the lost exchanged messages.

Embodiments of the non-transitory computer-readable storage medium store executable computer program instructions for executing the confined recovery, including instructions for identifying a failed worker system from the plurality of worker systems, wherein the failed worker system failed to execute during a current superstep and lost exchanged messages. The computer-readable storage medium further includes instructions for determining states of the partitions of the worker systems during the supersteps preceding the current superstep, and determining a recovery initiation superstep preceding the current superstep in which all messages for recovery initiation superstep are available. The recovery initiation superstep is determined responsive to determining the states of the partitions. Additionally, the computer-readable storage medium includes instructions for determining a recovery set of partitions for which messages in supersteps after the recovery initiation superstep are not available. The worker systems having the partitions in the recovery set are instructed to execute the defined function for the partitions in the recovery set starting at the recovery initiation superstep to recover the lost exchanged messages.

Embodiments of the system include a non-transitory computer-readable storage medium that stores executable computer program instructions for executing the confined recovery, including instructions for identifying a failed worker system from the plurality of worker systems, wherein the failed worker system failed to execute during a current superstep and lost exchanged messages. The computer-readable storage medium further includes instructions for determining states of the partitions of the worker systems during the supersteps preceding the current superstep, and determining a recovery initiation superstep preceding the current superstep in which all messages for recovery initiation superstep are available. The recovery initiation superstep is determined responsive to determining the states of the partitions. Additionally, the computer-readable storage medium includes instructions for determining a recovery set of partitions for which messages in supersteps after the recovery initiation superstep are not available. The worker systems having the partitions in the recovery set are instructed to execute the defined function for the partitions in the recovery set starting at the recovery initiation superstep to recover the lost exchanged messages.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
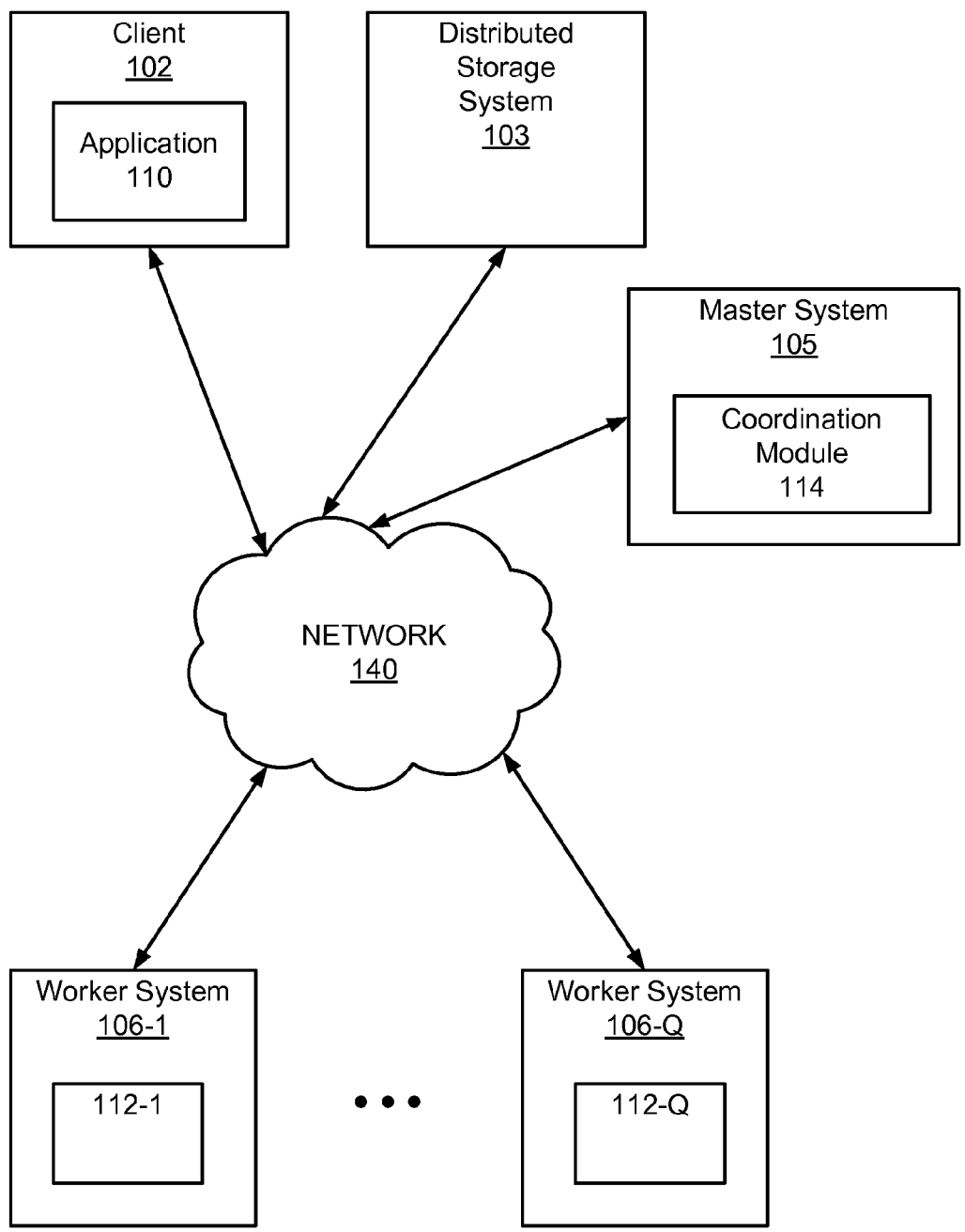
FIG. 1 is a block diagram of a distributed computing environment including a master system and worker systems for performing a confined recovery after failure of a worker system in the environment, according to one embodiment.

FIG. 1 is a block diagram of a distributed computing environment 100 including a master system 105 and worker systems 106 for performing a confined recovery after failure of a worker system 106 in the environment. FIG. 1 illustrates a client 102, a master system 105, a distributed storage system 103, and worker systems 106 connected by a network 140. Collectively, the distributed computing environment 100 is used to define a graph modeling real-world conditions as a set of relationships among a tangible set of items, such as documents and links on the Internet, a computer network topology, transportation routes in a geographic map, or a social graph. In addition, the computing environment 100 is used to analyze the modeled conditions in order to solve one or more real-world problems associated with the conditions. This analysis may apply one or more algorithms to the graph, like an algorithm for determining the shortest paths between vertices within the graph.

The client 102 provides the location of graph data describing the graph and provides a user program that includes one or more algorithms to be performed on the graph data. The graph data describing the graph may be stored on the distributed storage system 103. The graph itself is represented as a set of vertices connected by a set of directed edges and the graph data includes information about these vertices (for e.g., an identifier and the state of each of the vertices). In one embodiment, the set of edges in the graph may not be directed. The master system 105 assigns partitions of the graph data to the worker systems 106. Each partition includes data about a subset of vertices in the graph. The worker systems 106 perform the algorithm on the partitions of the graph data within their respective ambits.

A typical computation in the distributed computing environment 100 includes initialization of a graph and execution of the algorithm of the user program on multiple worker systems. At initialization, each worker system 106 is assigned one or more partitions that include a group of vertices. The worker systems 106 perform a sequence of iterations, or supersteps, separated by global synchronization points until the computation terminates and produces an output. Within each superstep, the worker systems 106 compute in parallel, and execute a defined function for their vertices. The defined function expresses the logic of the algorithm of the user program. A worker system 106 can modify its vertices' state or that of the vertices' outgoing edges, receive messages sent for its vertices in the previous superstep, send messages to other vertices (to be received in the next superstep), or even mutate the topology of the graph.

For each superstep, the worker system 106 determines messages created from its vertices for other destination vertices, determines if the created messages are ready for transmission, and transmits the ready messages. After the worker system 106 has transmitted all its messages for a given superstep, the worker system 106 transmits to the master system 105 a status message indicating success or failure of its transmitted messages for the superstep. The master system 105 receives such status messages from all the worker systems 106, combines the received status message into one group status message and transmits the group status message to all the partitions.

Some of the transmitted and received messages are stored in a persistent storage to recover from failure of a worker system 106. This persistent storage may reside within the worker system 106 or may reside on a system other than the worker system 106. The worker systems 106 store their outgoing messages for the current and a predetermined number of previous supersteps to the persistent storage. Additionally, the worker systems 106 store their incoming messages and their state to a persistent storage at checkpoints determined by the master system 105. If the master system 105 detects or identifies a failed worker system 106, the master system 105 determines a previous superstep from which the failed partitions of the failed worker system 106 can be recovered. The superstep is determined partly based on the partitions' state and messages stored in the persistent storage.

For recovery, the master system 105 also determines a recovery set including at least some of the failed partitions and, optionally, additional partitions required for recovering the state of the failed partitions. During recovery, the worker systems 106 managing these recovering partitions in the recovery set execute the defined function for the recovering partitions. The worker systems 106 for remaining partitions in the graph do not execute the defined function for the remaining partitions and instead transmit previously stored messages from these partitions to other partitions. Accordingly, the worker systems 106 do not execute the defined function for all their partitions during recovery and therefore such confined recovery beneficially conserves processor bandwidth amongst worker systems 106.

After recovery, the worker systems 106 continue the computation until a time when every vertex votes to halt. In superstep 0 (the initial superstep), every vertex is in the active state, and all active vertices participate in the execution of any given superstep. A vertex deactivates itself by voting to halt. Halting means that the vertex has no further work to do unless triggered externally, and that vertex will not execute in subsequent supersteps unless it receives a message. If reactivated by a message, a vertex must explicitly deactivate itself again. The computation as a whole terminates when all vertices are simultaneously inactive and there are no messages in transit.

The output of the computation is a set of values explicitly output by the vertices. The output represents a solution to the real-world problem associated with the modeled conditions involving the set of relationships among the set of items. Thus, for a solution seeking to find the shortest path between two items, the output of the algorithm is a path through the graph from the vertex representing the first item to the vertex representing the second item. The path, for example, may represent a transportation route, computer network route, or the time it takes to travel between geographic locations.

Turning now to the specific entities illustrated in FIG. 1, the client 102 is a computing device with a processor and a memory that includes an application 110 for providing the master system 105 with a user program and graph data (or location of the graph data). The user program includes a defined function executed by the active vertices in each superstep. The application 110 sends a copy of the user program to the master system 105. The application 110 also sends graph data or a location of the graph data to the master system 105.

The distributed storage system 103 includes one or more computing devices that may store the graph data. The distributed storage system 103 may provide the graph data to the systems connected to network 104 (i.e., client 102, master system 105, and worker system 106). In some embodiments, the graph data is stored as a plurality of graph partitions, where a graph partition stores data describing a subset of the edges and vertices of a graph. In one embodiment, the distributed storage system 103 stores a file for each graph partition. In another embodiment, the distributed system 103 stores a file per each graph partition including the output for a computation from the vertices of the partition.

The master system 105 is a computing device with a processor and a memory. The master system 105 receives graph data (or location of the graph data) and a user program from the client 102, assigns partitions of the graph data to the worker systems 106, provides copies of the user program to the worker systems, coordinates the parallel execution of the user program on the worker systems, and reports results of the execution to the client. The master system 105 includes a coordination module 114 that executes a copy of the user program that acts as a master or coordinator for the execution of the copies of the user program on the worker systems 106. For each superstep, the coordination module 114 receives a status message from each alive worker system 106 indicating whether the worker system 106 was successful in transmitting its outgoing message batches for the superstep. After receiving all the status messages, the coordination module 114 creates a group status message indicating the transmission status of each worker system 106 for the superstep and transmits the group status message to the worker systems 106. Such group status message beneficially enables the worker systems 106 to determine the message transmission status of the other worker systems 106 without exchanging status messages with each other.

The master system 105 also provides confined recovery after detecting or identifying a failed worker system 106. To provide confined recovery, the coordination module 114 determines whether one or more checkpoint criteria have been met at a particular superstep. If yes, the coordination module 114 transmits a message to the worker systems 106 instructing them to save the state of their assigned partitions to a persistent storage. After detecting a failed worker system 106, the coordination module 114 determines, based on information stored in persistent storage, a previous superstep from which a recovery can be conducted. The coordination module 114 also determines a recovery set of partitions that need to execute the defined function to recover from the failure. The coordination module 114 then assigns the partitions of the failed worker system 106 to healthy worker systems 106 and instructs the recovering worker systems 106 with recovering partitions (i.e. partitions in the recovery set) to execute the defined function. The coordination module 114 instructs the healthy worker systems 106 with healthy partitions (i.e. partitions not included in the recovery set) to retrieve their outgoing messages from the persistent storage and transmit them to the destination worker systems 106. The process of instructing the recovering and healthy worker systems 106 continues until the superstep where the failure was detected. At this point, the partitions of the failed worker system 106 have recovered and the coordination module 114 resumes and continues the computation until it is completed. The coordination module 114 is described below in the context of FIG. 3.

A worker system 106 is a computing device with a processor and a memory. The worker systems 106 and the master system 105 are similar types of systems in one embodiment. A worker system 106 includes a worker module 112 that stores one or more partitions. The worker module 112 also stores and executes a copy of the user program on the one or more partitions stored on the worker system 106.

The worker module 112 executes supersteps of a user program in response to receiving instructions from the master system 105. During a superstep, the worker module 112 executes the defined function for each active vertex in the one or more partitions stored on the worker module 112. A vertex that is active during a superstep may process messages received from other vertices in a previous superstep and may send messages to other vertices in order to obtain information about other vertices or edges, to add or remove vertices or edges, and to modify vertices or edges. The worker module 112 groups or batches messages to be transmitted to destination vertices based on the partition including the destination vertices. When a message batch surpasses a threshold size, the worker module 112 determines that the message batch is ready for transmission and transmits the batch to the destination worker system 106 that manages the destination partition.

After the worker module 112 has transmitted all its batches for a superstep, the worker module 112 transmits a status message to the master system 105 indicating the status of the transmission (i.e. status indicating whether it failed or succeeded in transmitting all the outgoing batches). The master system 105 creates a group status message indicating the transmission status of the worker systems 106 and transmits the status message to the worker systems 106. The worker module 112 receives the group status message to determine the status of message transmissions from other worker systems 106. In the next superstep, the worker module 112 analyzes the received group status message to determine if it has received all its incoming messages for the superstep. If the worker module 112 has received all the incoming messages, the worker module 112 executes the defined function and processes the received messages. In this manner, each worker system 106 beneficially receives one status message every superstep from the master system 105 indicating the status of transmissions from other worker system 106. The worker systems 106 need not transmit to or receive status messages from numerous worker systems 106 processing different partitions of the graph.

When the superstep is finished, the worker module 112 sends a message to the master system 105 indicating the number of vertices that will be active in the next superstep. The supersteps continue as long as there are active vertices or there are messages in transit. When the supersteps are finished, the worker module 112 sends the results generated from the user program to the master system 105.

The worker module 112 stores the state of its assigned one or more partitions for the current superstep in volatile memory. This may include the state of each vertex in the one or more partitions where the state of each vertex includes its current value, a list of its outgoing edges (which includes the vertex name for the edge's destination and the edge's current value), a queue containing incoming messages, and a flag specifying whether the vertex is active. The worker module 112 also stores the state of its assigned one or more partitions to a persistent storage after receiving a message from the master system 105 with instructions to do so. The master system 105 instructs the worker modules 112 in the worker systems 106 to store the state in the persistent storage after determining that one or more checkpoint criteria have been met. The stored state in persistent storage beneficially enables the worker module 112 to access data required for recovering a failed worker. Additionally, the worker module 112 stores in a persistent storage a queue containing outgoing messages for the current superstep and for a predetermined number of previously executed supersteps.

The network 140 represents the communication pathways between the client 102, the master system 105 and the worker systems 106. In one embodiment, the network 140 uses standard Internet communications technologies and/or protocols. Thus, the network 140 can include links using technologies such as Ethernet, IEEE 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
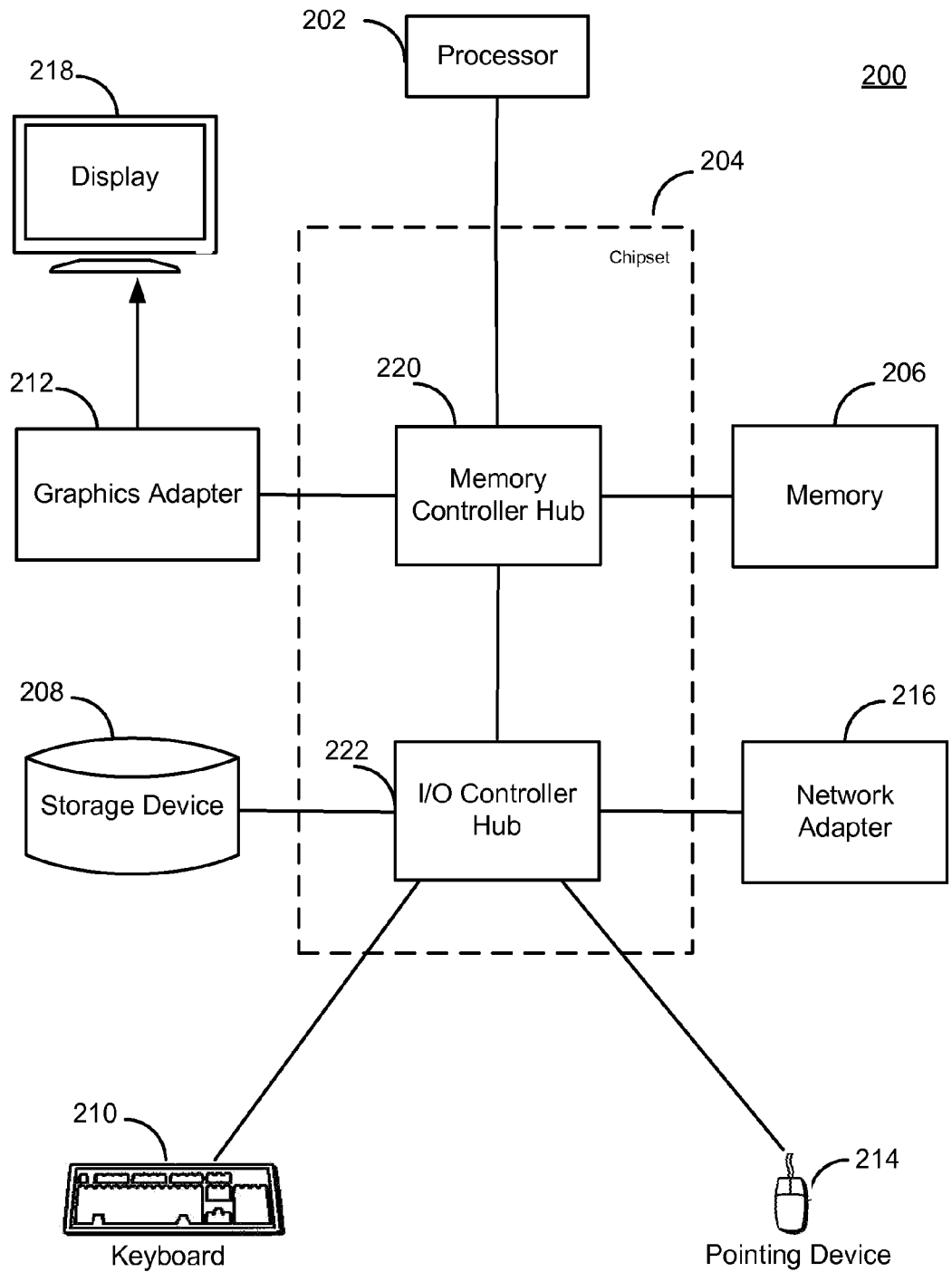
FIG. 2 is a block diagram illustrating an example of a computer, according to one embodiment.

FIG. 2 is a block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The storage device 208 acts as the persistent storage in one embodiment. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
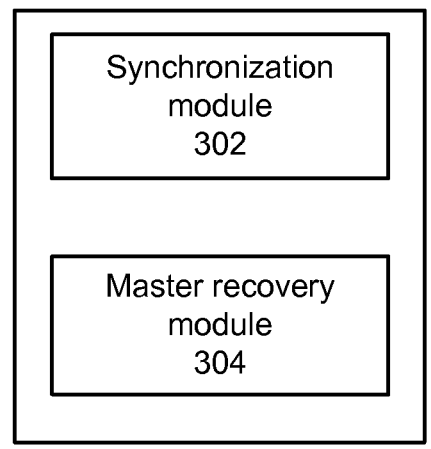
FIG. 3 is a block diagram illustrating modules within a coordination module of the master system, according to one embodiment.

FIG. 3 is a block diagram illustrating modules within a coordination module 114 of the master system 105, according to one embodiment. The coordination module 114 comprises a synchronization module 302 and a master recovery module 304. These modules 302-304 assign partitions to the worker systems 106, coordinate execution of the user program at the worker systems 106, and provide fault tolerance for the worker systems 106.

The synchronization module 302 assigns different partitions of the graph to different worker systems 106 and coordinates execution of the user program for the assigned partitions at the worker systems 106. To assign partitions, the synchronization module 302 receives registration messages from the worker systems 106 and registers the worker systems 106 by assigning unique identifiers to the worker systems 106. The synchronization module 302 then determines the number of partitions the graph will have, assigns one or more partitions to each registered worker system 106, and transmits to each worker system 106 its assigned one or more partitions. A partition of a graph includes a subset of the vertices and edges of the graph. The number of partitions may be specified in the user program or determined by a partition function stored in the synchronization module 302. For example, the default partitioning function may be a hash of a vertex identifier modulo N, where N is the number of partitions. In one embodiment, the master system 105 is not assigned any portion of the graph.

The synchronization module 302 maintains a list of the registered worker systems 106 which includes the identifiers of the registered worker systems 106 and the addressing information of the registered worker systems 106. For a respective registered worker system 106, the list includes information identifying the graph partitions assigned to that worker system. In some embodiments, the synchronization module 302 transmits to each worker system 106 the list of the registered worker systems 106. The list enables the source worker systems 106, which transmit messages from their source partitions to destination partitions, to determine destination worker systems 106 that host the destination partitions.

The synchronization module 302 also coordinates the execution of the user program by the worker systems 106 at various supersteps. To coordinate the execution, the synchronization module 302 transmits to each worker system 106 a copy of the user program and initiates the execution of the user program on the worker systems 106. More specifically, the synchronization module 302 signals the beginning of a superstep and transmits a message to the worker systems 106 that instructs the worker systems 106 to execute the defined function for the superstep. The worker systems 106 receive the instructions, execute the defined function for each active vertex in the worker system 106, transmit outgoing messages from source partitions to destination partitions, determine whether the transmission was successful and report the status of transmission for each of its source partitions to the synchronization module 302.

Accordingly, for each superstep, the synchronization module 302 receives a status from each worker system 106 indicating whether the source partitions in the worker system 106 successfully transmitted all their outgoing messages. Based on the received status messages, the synchronization module 302 creates a group status message indicating the transmission status of every partition for the current superstep and transmits the created message to each worker system 106. This group status message beneficially allows a given worker system 106 to determine whether it received all the required messages for its partitions for a given superstep. The process of making this determination is described below in description of the worker system 106 in FIG. 4. The synchronization module 302 also stores the group status message for each superstep in a persistent storage.

The synchronization module 302 also receives updates from the worker systems 106 and maintains statistics about the progress of a computation and the state of the graph, such as the total size of the graph, a histogram of its distribution of out-degrees, the number of active vertices, the timing of recent supersteps, and the message traffic of recent supersteps.

The master recovery module 304 provides fault tolerance for the group of worker systems 106. Fault tolerance is achieved through checkpointing. During or at the beginning of a superstep, the master recovery module 304 determines whether one or more checkpoint criteria have been satisfied. Examples of checkpoint criteria are whether a predetermined amount of time or a predetermined number of supersteps have elapsed since the previous checkpoint. If the checkpoint criteria are satisfied, the master recovery module 304 transmits a message to the worker systems 106 instructing them to save the state of their partitions to persistent storage, including vertex values, edge values, and incoming messages. This saved information is used to recover a failed worker system 106.

The master recovery module 304 detects failure of or identifies a failed worker system 106 through messages that the master recovery module 304 periodically sends to the worker systems 106. If the master recovery module 304 does not receive a reply message from a worker system 106 after a specified interval, the master recovery module 304 determines that the unresponsive worker system 106 has failed. If a worker system 106 does not receive a message from the master recovery module 304 after a specified time interval, the worker system 106 terminates its processes, does not respond to messages from the master recovery module 304, and is consequently determined failed by the master recovery module 304. When a worker system 106 fails, the current state of the partitions assigned to the worker system 106 is lost. To recover from a worker system 106 failure, the master recovery module 304 executes a recovery routine.

In the recovery routine, the master recovery module 304 determines a recovery initiation superstep at which the recovery should begin. The master recovery module 304 also determines a recovery set of partitions for which the incoming or outgoing messages are not available at the recovery initiation superstep. To make these determinations, the master recovery module 304 initializes the recovery initiation superstep to the superstep where the failure of a worker system 106 was detected. The master recovery module 304 also initializes the recovery set to an empty set of partitions. The master recovery module 304 then determines the state of the partitions at the recovery initiation superstep.

A partition has one of the four following states at a superstep: undetermined, incomplete, ready and complete. A partition is in the undetermined state for a superstep if all the outgoing messages for the partitions are not available (i.e. the outgoing messages are not available on volatile or persistent storage and the outgoing messages cannot be generated) for that superstep. A partition is in the incomplete state for a superstep if the partition does not have a complete set of incoming messages to be processed at that superstep. A partition is in the ready state for a superstep if the partition has a complete set of incoming messages to be processed at that superstep. The outgoing messages for the ready partition are not available at the beginning of the current superstep, but a worker system 106 may generate the outgoing messages after executing the defined function for the ready partition at the current superstep. A partition is in the complete state for a superstep if the worker system 106 has successfully executed the defined function for the partition at that superstep and the outgoing messages generated from the execution of the defined function are available.

The master recovery module 304 analyzes the states of the partitions at the recovery initiation superstep and determines if any partitions are in the undetermined state. If yes, the master recovery module 304 adds the undetermined partitions to the recovery set. At this stage, the recovery initiation superstep is the superstep where failure of the worker system 106 was detected. If the worker system 106 failed before creating and writing all of the outgoing messages for any of its partitions for this superstep, the undetermined partitions would include at least those partitions because outgoing messages for those partitions are not available. The master recovery module 304 then sets the recovery initiation superstep to its immediately preceding superstep. The master recovery module 304 then repeats the steps of determining the undetermined partitions at the new recovery initiation superstep and resetting the new recovery initiation superstep if undetermined partitions are found.

The master recovery module 304 repeats these steps until a recovery initiation superstep does not include undetermined partitions. After the master recovery module 304 determines a recovery initiation superstep where no undetermined partitions exist, the master recovery module 304 determines if any incomplete partitions exist at the determined recovery initiation superstep. If yes, the master recovery module 304 includes the incomplete partitions in the recovery set and sets the recovery initiation superstep to its immediately preceding superstep. If the recovery initiation superstep is a superstep where the checkpoint occurred, the partitions would have their incoming messages stored at least on the persistent storage. Although the incoming messages stored on the persistent storage may not include a complete set of incoming messages for every partition, the number of partitions with an incomplete set of incoming messages is likely to be few (if any) at the checkpoint. Accordingly, checkpoints beneficially provide supersteps at which the worker systems 106 are likely to have adequate information to recover the failed partitions.

Upon setting the recovery initiation superstep to its preceding superstep, the master recovery module 304 then determines if any undetermined partitions exist at the new recovery initiation superstep. The master recovery module 304 keeps repeating the above mentioned steps, expanding the recovery set, and setting the recovery initiation superstep to its immediately preceding superstep until a superstep is determined where all messages required to execute the superstep are available (i.e. a superstep where no undetermined or incomplete partitions exist). If no such superstep is determined, the computation is initialized from the beginning, partitions are assigned to worker systems 106 and supersteps are executed. If such a superstep is determined, the determined superstep is the recovery initiation superstep and the recovery set at this superstep is the recovery set including all the worker systems 106 in the undetermined or incomplete state at this superstep.

After the recovery initiation superstep is determined, the master recovery module 304 assigns the partitions of the failed worker systems 106 at the determined superstep to healthy worker systems 106. In one embodiment, the master recovery module 304 equally distributes the partitions of the failed worker systems 106 amongst the healthy worker systems 106. The equal distribution beneficially ensures that a healthy worker system 106 is not overloaded after partitions from the failed worker systems 106 are assigned to the healthy worker system 106. After the distribution, the master recovery module 304 updates the worker systems 106 with a reassignment message indicating the reassigned worker systems 106 responsible for partitions from the failed worker system 106. The update beneficially enables the worker systems 106 to transmit messages destined for these partitions to the reassigned worker systems 106.

The master recovery module 304 then marks the recovery initiation superstep as the current recovery superstep and instructs the worker systems 106 (hereinafter "recovering worker systems") with partitions (hereinafter "recovering partitions") in the recovery set to execute the defined function at the current recovery superstep for the recovering partitions. If a worker system 106 determines that it does not have a complete set of messages for its recovering partition, the worker system 106 may request the required messages from other partitions. After the worker system 106 has access to the complete set of incoming messages for its recovering partitions, the worker system 106 executes the defined function for the partitions and transmits their outgoing messages.

The master recovery module 304 also instructs the worker systems 106 to retrieve outgoing messages created and stored in the persistent storage by the healthy partitions (i.e. partitions outside the recovery set) at the current recovery superstep. The master recovery module 304 instructs the worker systems 106 to transmit the retrieved messages destined for the recovering partitions. Because the worker systems 106 do not execute the defined function for the healthy partitions and instead transmit already stored healthy partitions' outgoing messages, the recovery of the failed partitions is a confined recovery where only the recovering partitions perform the computation required for the defined function during the recovery. Such confined recovery beneficially conserves processor bandwidth.

Once the worker systems 106 have performed the defined function and transmitted the outgoing messages for the current recovery superstep, the worker systems 106 update the master recovery module 304 about the completion of their task. The master recovery module 304 determines if the current recovery superstep is the superstep where the failure of the worker system 106 was detected. If yes, the recovery is complete and the master recovery module 304 exits the recovery routine. Otherwise, the master recovery module 304 sets the current recovery superstep to its immediately following superstep. The master recovery module 304 then repeats the above mentioned steps until the current recovery superstep is the superstep where the failure was detected.

Figure 4:
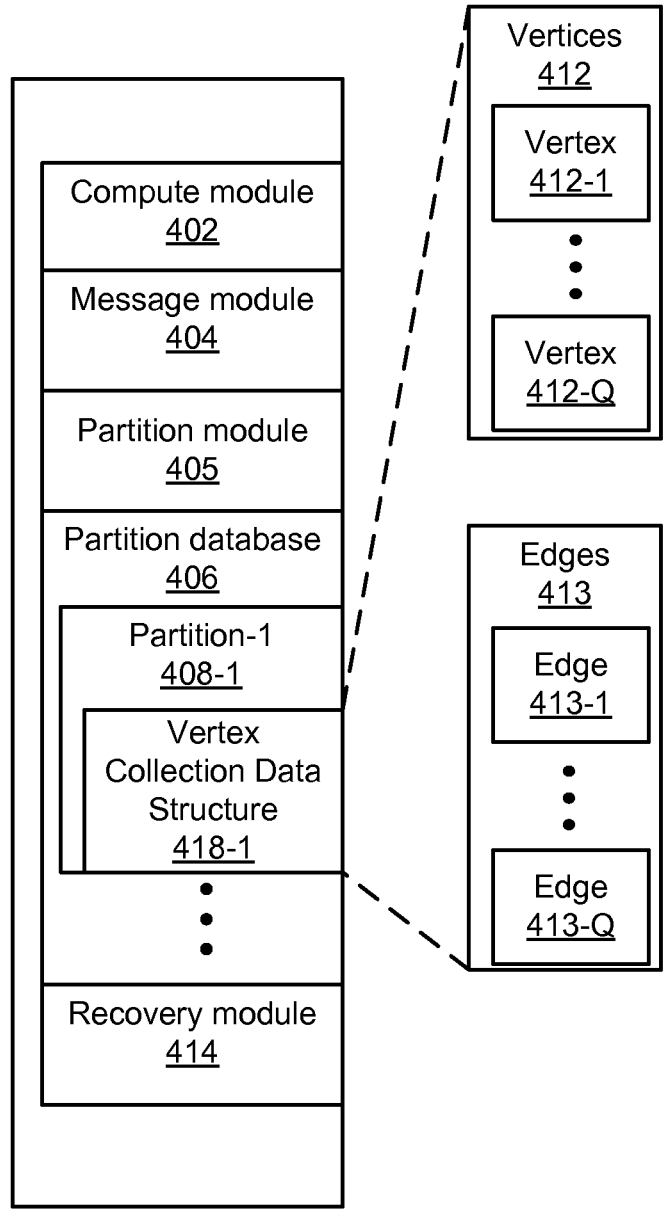
FIG. 4 is a block diagram illustrating modules within the worker module of a worker system, according to one embodiment.

FIG. 4 is a block diagram illustrating modules within the worker module 112 of a worker system 106, according to one embodiment. These modules store one or more partitions of a graph, execute a copy of the user program, and modify the one or more partitions of the graph responsive to operations of the user program.

The worker module 112 includes a partition module 405 that manages the data in the partition database 406. The partition module 405 receives graph data describing a partition of a graph and stores the graph data as a vertex collection data structure 418 in the partition database 406. The partition module 405 also saves and updates the state of the partitions 408 in the partition database 406 in response to execution of the defined function, or reception of messages from the master system 105 or the worker systems 106.

The worker module 112 includes a partition database 406 that stores one or more partitions 408 of a graph. A partition 408 stores information for a subset of the vertices and edges of a graph. A partition 408 is stored as a vertex collection data structure 418. The vertex collection data structure 418 stores information for the vertices 412 and the edges 413 of a partition 408. The information for the vertices 412 includes vertex names and vertex values. The information for the edges 413 includes edge destination names and edge values. In some embodiments, the edge values indicate a distance or cost of traveling between two vertices. For example, when the graph corresponds to a geographic map and the vertices correspond to cities, the edge values may indicate distances between the cities.

The compute module 402 executes the defined function in a superstep for each active vertex of partition 408. In one embodiment, the defined function is executed for vertices in a graph to achieve various results like determining the shortest paths from a source vertex to all other vertices in the graph. The graph models a real-world condition and may represent, for example, a geographic map, computer network, or social network. In a given superstep, the compute module 402 determines the active vertices and executes the defined function for the active vertices. The execution of the defined function includes processing data received from incoming messages for a vertex and generating outgoing messages for other vertices. It is not necessary for a defined function to receive input from incoming messages and generate outgoing messages at every execution of the defined function.

The worker module 112 includes a message module 404 that sends and receives messages for vertices included in the partitions 408 managed by the worker module 112. The messages may be exchanged between vertices managed by the same worker module 112 or by different worker modules 112 residing in different worker systems 106. The vertices may send messages to other vertices in order to obtain information about other vertices, to add or remove vertices or edges, and to modify vertices and edges. For each vertex in the partitions 408, the message module 404 stores messages generated for and generated from the vertex in incoming and outgoing message queues.

The outgoing messages from a vertex are generated for various reasons like execution of the defined function for the vertex in a superstep. The compute module 402 executes the defined function, generates outgoing messages, and transmits the outgoing messages to the message module 404. The message module 404 stores the outgoing messages in the appropriate outgoing queue. The message module 404 maintains separate outgoing queues for separate destination partitions. Accordingly, outgoing messages created by all the vertices of a partition 408 and destined for vertices in a destination partition are stored in the same outgoing queue. The destination partition may or may not be stored on the same worker system 106 as the vertices that created the outgoing messages. In other embodiments, the message module 404 maintains separate outgoing queues for separate destination vertices, separate source vertices or separate source partitions.

The message module 404 monitors the size of the outgoing message queues and determines if the size of a growing queue has surpassed a threshold size. If yes, the message module 404 transmits the batch of messages in the queue to its destination partition. In one embodiment, the message module 404 transmits the batch of messages every superstep regardless of the size of the outgoing queue. The message module 404 also generates and includes a batch size message in the outgoing batch that specifies the total number of messages in the batch. The batch size message beneficially enables the message module 404 for the destination partition to determine if a received batch of messages is missing any messages.

Each superstep, the message module 404 transmits the message batches ready for transmission to the worker systems 106 that store the batches' destination partitions. After the message module 404 has transmitted the message batches, the message module 404 transmits a status message indicating to the master system 105 whether or not the transmission succeeded. This status message beneficially enables the message module 404 for the destination partition to determine if the message module 404 has received all the batches meant for the destination partition for a superstep.

The message module 404 also stores the outgoing batches in a persistent storage. These stored outgoing batches beneficially enable worker systems 106 to recover a failed partition. Storing outgoing batches to persistent storage may take longer than transmitting the outgoing batches because of various inefficiencies associated with writing data to persistent storage. In one embodiment, the message module 404 writes the outgoing batches to the persistent storage in parallel to transmission of the outgoing batches (by, e.g., using separate threads for writing to persistent storage and for transmission of the batches). After the message module 404 has attempted transmitting all ready batches (some batches may not be successfully sent and therefore an attempt is all that is required), the message module 404 transmits the status message to the master system 105 without waiting for the messages to be written to the persistent storage. Such parallel processing beneficially enables the master system 105 to receive status messages earlier than it would have received them if the message module 404 waited to write all of the outgoing batches for a superstep to the persistent storage before transmitting the status message.

The message module 404 also stores and maintains incoming message queues for partitions 408. In one embodiment, for each partition 408, the message module 404 stores separate incoming message queues for the current superstep and the next superstep. The incoming message queue for the current superstep includes messages received in the previous superstep for processing in the current superstep, and the incoming message queue for the next superstep includes messages being received in the current superstep.

For each superstep, the message module 404 receives message batches from various partitions and determines if the received batches are missing any messages. Some of the messages may not have reached the destination partition because of network error or worker system 106 failure. The message module 404 therefore analyzes the batch size message in a batch and compares the number of messages in the batch with the number specified in the batch size message. If the numbers match, the message module 404 determines that the received batch is complete. Otherwise, the message module 404 requests and receives the missing messages from the source partition. In this manner, the message module 404 beneficially determines whether a received batch from a source partition includes a complete set of message.

Some source partitions may not have sent any batches to a particular destination partition because they did not have any messages for the destination partition for the current superstep. Other source partitions may have failed to send their message batches for the destination partition. To determine the reason for not receiving a message batch from a partition, the message module 404 analyzes the group status message received for the messages transmitted in the previous superstep. Again, the group status message indicates whether source partitions successfully transmitted all their messages. If the group status message indicates that a source partition had successfully transmitted all its messages and the destination partition's message module 404 did not receive a batch from that source partition, the message module 404 determines that the source partition did not have any messages for the destination partition for processing in the current superstep. If the group status message indicates that a source partition was not successful in transmitting all its messages, the destination message module 404 inquires of the source message module 404 managing the source partition regarding any messages it might have for the destination partition. The message module 404 then either receives the missing message batch or is informed that the source partition did not have any messages for the destination partition.

In this manner, a single group status message sent from the master system 105 to the worker systems 106 enables the worker systems 106 to determine if they received all their messages. Each worker system 106 need not receive status messages from all other worker systems 106 for verifying reception of all the incoming messages. After the message module 404 receives all the messages for its partitions, the compute module 404 executes the defined function for the superstep and processes the received messages.

The worker module 112 includes a recovery module 414 that is responsible for executing the recovery routine when a worker system 106 fails. During recovery, the master system 105 assigns the partitions of the failed worker system 106 to other worker systems 106, determines a recovery set of partitions, determines a recovery initiation superstep, and transmits a message to the worker systems 106 indicating the recovery set and the recovery initiation superstep. The recovery module 414 in each of the worker systems 106 determines if the worker system 106 includes any partitions in the recovery set (hereinafter "recovering partitions"). If yes, the recovery module 414 executes the defined function for the recovering partitions. The execution of the defined function for the recovering partitions results in an updated state for some of the recovering partitions. This updated state may again be transformed after execution of the defined function for the recovering partitions at the next recovery superstep. The state of the recovering partitions is therefore repeatedly updated until the recovery routine is complete and the worker systems 106 have determined the state of their recovering partitions (including the failed partitions) at the superstep where failure was detected. Because the healthy partitions' state is already available at the superstep where failure was detected, the recovery module 414 does not execute the defined function for the healthy partitions during the recovery supersteps. This confined recovery that includes execution of the defined function for only the recovering partitions beneficially conserves processing bandwidth.

To execute the defined function for a recovering partition at a recovery superstep, the recovery module 414 retrieves the recovering partitions' complete set of incoming messages for the recovery superstep from the message module 404. If the recovery superstep is a superstep where the worker systems 106 stored their state to the persistent storage (i.e. a superstep where one or more checkpoint criteria was met), the message module 404 may retrieve the set of incoming messages for the superstep from the persistent storage. If the retrieved set of incoming messages is incomplete, the message module 404 requests and receives the missing messages from the source partitions. After the recovery module 414 receives the complete set, the recovery module 414 executes the defined function. Next, the recovery module 414 transmits the outgoing messages for the recovering and the healthy partitions, and updates the master system 105 regarding the status of the outgoing messages' transmission. The recovery module 414 also stores incoming messages for the recovering partitions. Because the recovery module 414 does not execute the defined function for the healthy partitions, the recovery module 414, in one embodiment, does not store the incoming messages for the healthy partitions. In other embodiments, the recovery module 414 stores the incoming messages for the healthy partitions. The recovery module 414 repeats the above mentioned steps for subsequent recovery supersteps after receiving instructions from the master system 105 to do so. If no additional recovery supersteps remain, the recovery routine ends and the compute module 402 takes over the execution of the defined function for subsequent supersteps.

Figure 5:
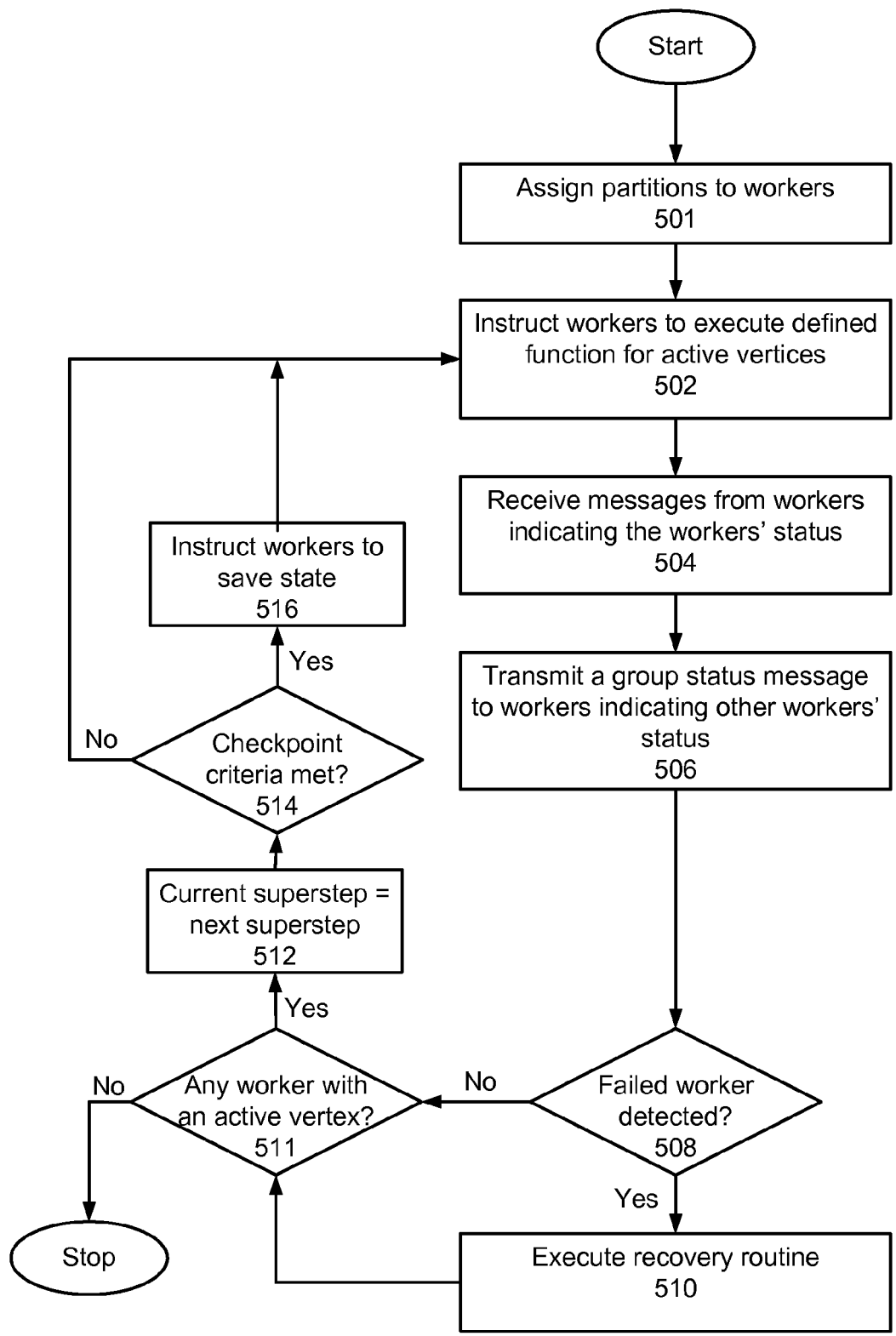
FIG. 5 is a flow diagram illustrating the steps executed by the master system for a computation, according to one embodiment.

FIG. 5 is a flow diagram illustrating the steps executed by the master system 105 for a computation, according to one embodiment. The master system 105 assigns 501 partitions to the worker systems 106 and instructs 502 the worker systems 106 to execute the defined function for the active vertices. The worker systems 106 execute the defined function, generate outgoing messages, and transmit to the master system 105 the status of their outgoing message transmission. The master system 105 receives 504 the status messages for the worker systems 106, creates a group status message indicating message transmission status of each worker system 106, and transmits 506 the group status message to the worker systems 106. The master system 105 also determines 508 if any of the worker systems 106 have failed during the superstep. If yes, the master system 105 executes 510 the recovery routine. After executing the recovery routine or determining that none of the worker systems 106 have failed, the master system 105 determines 511 if any vertex in one of the worker systems 106 is active. If not, the computation is complete. Otherwise, the master system 105 sets 512 the current superstep to the next superstep and determines 514 if the checkpoint criteria have been met. If not, the master system 105 executes steps 502-514 again. If the checkpoint criteria have been met, the master system 105 instructs 516 the worker systems 106 to save their state and then executes steps 502-516. Steps 502-516 are repeated until none of the worker systems 106 have an active vertex and the computation has been completed.

Figure 6:
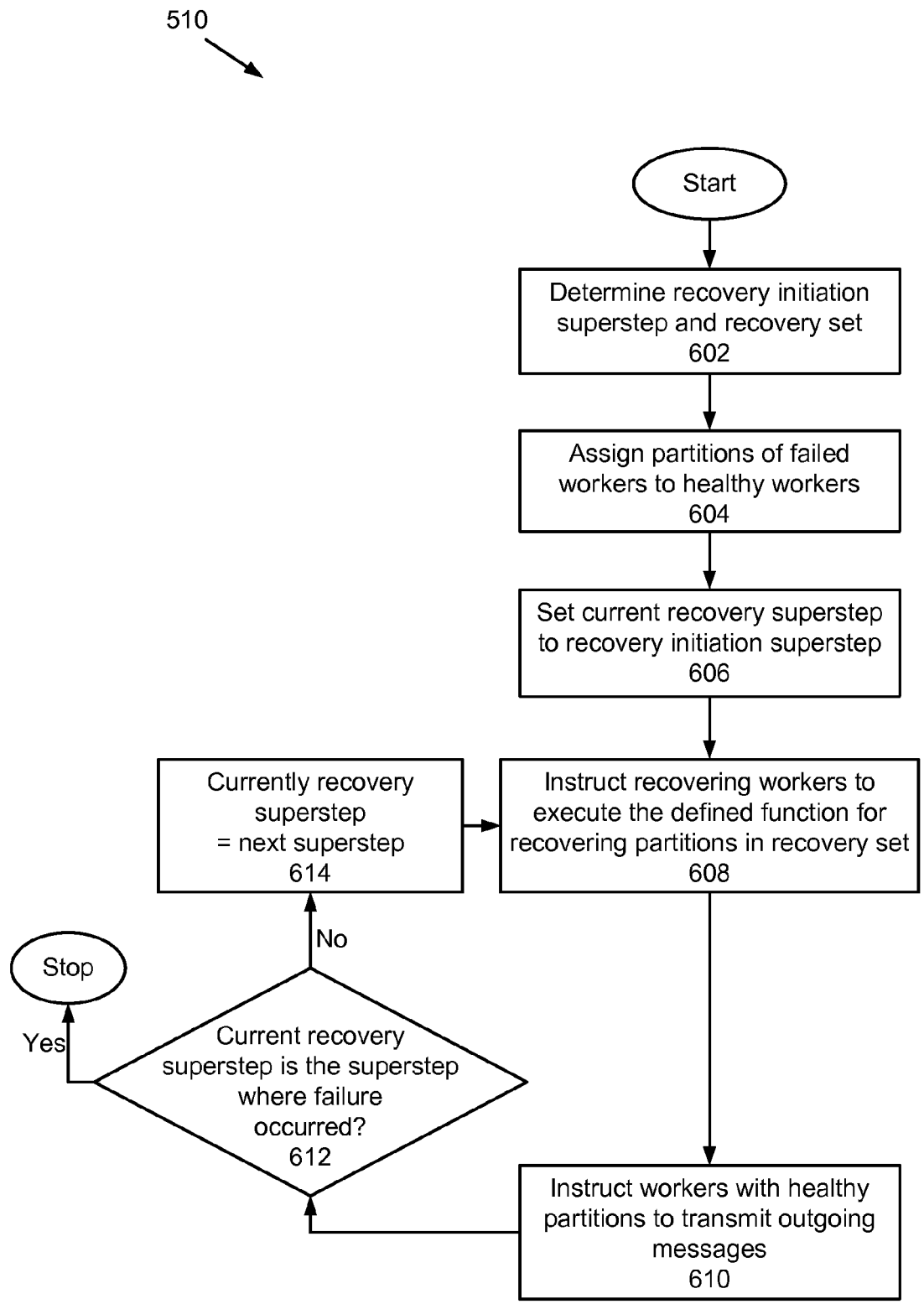
FIG. 6 is a flow diagram illustrating the recovery routine executed by the master system for recovering a failed worker system, according to one embodiment.

FIG. 6 is a flow diagram illustrating the recovery routine executed by the master system 105 for recovering a failed worker system 106, according to one embodiment. After determining that a worker system 106 failed, the master system 105 determines 602 the recovery initiation superstep and recovery set. The method for determining the recovery initiation superstep and recovery set is described below in FIG. 10. The master system 105 then assigns 604 the partitions of the failed worker system 106 to healthy worker systems 106 and sets 606 the current recovery superstep to the determined recovery initiation superstep. The master system 105 next instructs 608 the recovering worker systems 106 to execute the defined function for recovering partitions. The master system 105 instructs 610 the worker systems 106 with healthy partitions to transmit outgoing messages for healthy partitions and determines 612 if the current recovery superstep is the superstep where failure occurred. If not, the master system 105 sets 614 the current recovery superstep to its immediately following superstep. The master system 105 repeats steps 608-614 until the current recovery superstep is the superstep where the failure occurred. Once the current recovery superstep is the superstep where failure occurred, the master system 105 exits the recovery routine.

Figure 10:
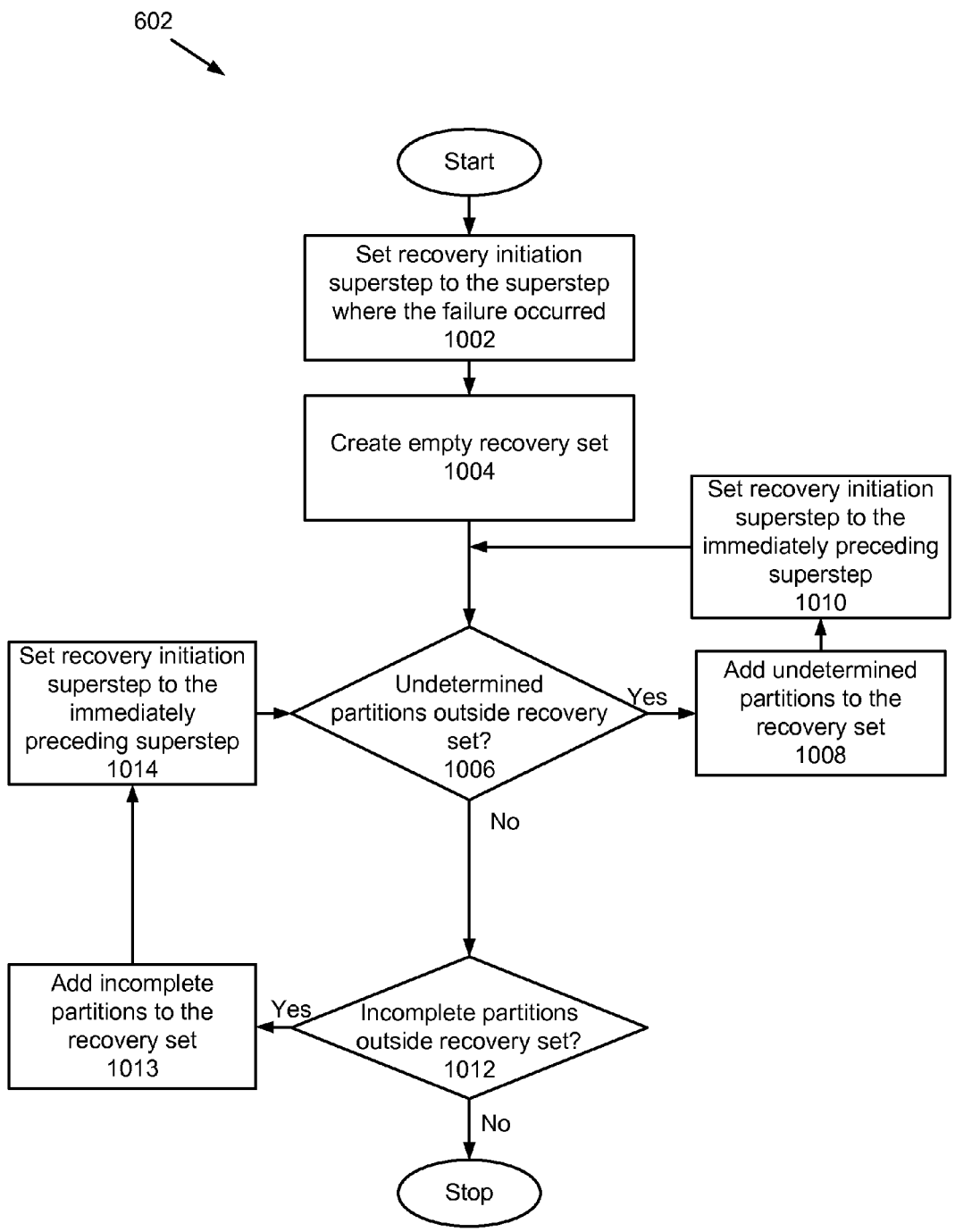
FIG. 10 is a flow diagram illustrating the steps executed by the master system to determine the recovery initiation superstep and the recovery set of partitions, according to one embodiment.

FIG. 10 is a flow diagram illustrating the steps executed by the master system to determine the recovery initiation superstep and the recovery set of partitions, according to one embodiment. To determine the recovery initiation superstep and the recovery set, the master system 105 sets 1002 the recovery initiation superstep to the superstep where the worker system 106 failed and creates 1004 an empty recovery set. The master system 105 then determines 1006 if any undetermined partitions exist outside the recovery set. If yes, the master recovery system 105 adds 1008 the undetermined partitions to the recovery set and sets 1010 the recovery initiation superstep to its immediately preceding superstep. The master system 105 repeats steps 1006-1010 until no undetermined partitions exist outside the recovery set.

The master system 105 then determines 1012 if any incomplete partitions exist outside the recovery set. If yes, the master recovery system 105 adds 1013 the incomplete partitions to the recovery set and sets 1014 the recovery initiation superstep to its immediately preceding superstep. The master system 105 repeats steps 1006-1014 until no undetermined or incomplete partitions exist outside the recovery set.

Figure 7:
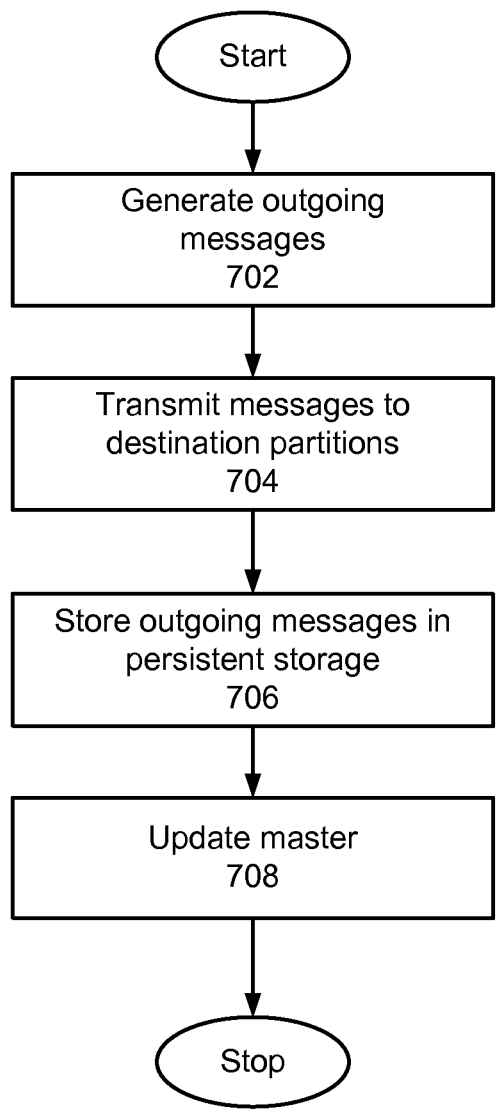
FIG. 7 is a flow diagram illustrating the steps executed by a worker system transmitting messages to other worker systems in a superstep, according to one embodiment.

FIG. 7 is a flow diagram illustrating the steps executed by a worker system 106 transmitting messages to other worker systems 106 in a superstep, according to one embodiment. The worker system 106 generates 702 outgoing messages and transmits 704 the generated messages to their destination partitions. The worker system 106 also stores 706 the outgoing messages to a persistent storage and updates 708 the master system 105 regarding whether the transmission of outgoing messages was successful or not.

Figure 8:
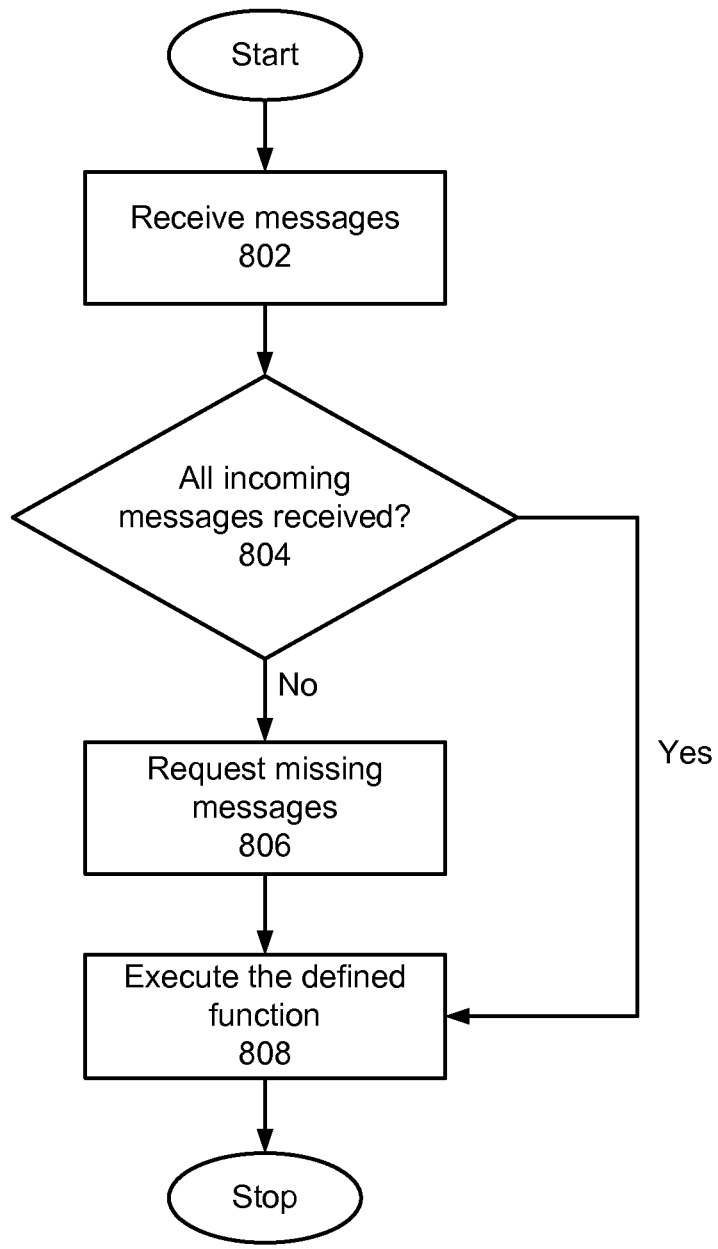
FIG. 8 is a flow diagram illustrating the steps executed by a worker system receiving messages from other worker systems in a superstep, according to one embodiment.

FIG. 8 is a flow diagram illustrating the steps executed by a worker system 106 receiving messages from other worker systems 106 in a superstep, according to one embodiment. The receiving worker system 106 receives 802 messages from other worker systems 106 and determines 804 whether the receiving worker system 106 received all the incoming messages meant for the worker system 106. If not, the worker system 106 requests 806 the missing messages from the other worker systems 106. After all incoming messages are received 804, the receiving worker system 106 executes 808 the defined function and processes the received messages.

Figure 9:
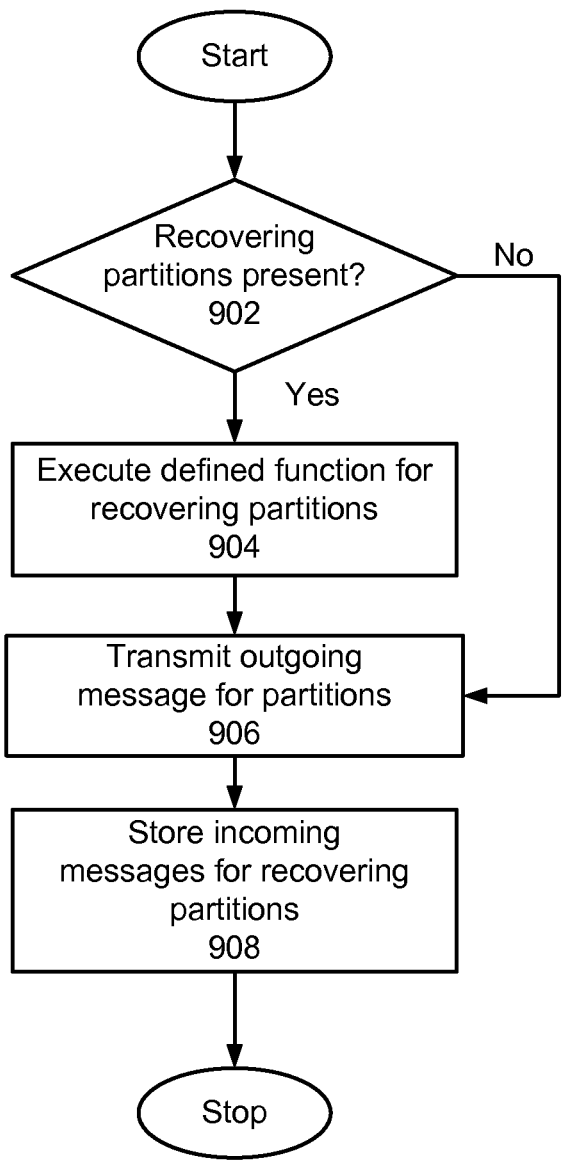
FIG. 9 is a flow diagram illustrating the steps executed by a worker system during a recovery superstep, according to one embodiment.

FIG. 9 is a flow diagram illustrating the steps executed by a worker system 106 during a recovery superstep, according to one embodiment. During a recovery superstep, the worker system 106 determines 902 if one or more of its partitions is a recovering partition. If so, the worker system 106 executes 904 the defined function for its recovering partitions. If the worker system determines 902 that it does not have a recovering partition, or after executing 904 the defined function for its recovering partitions, the worker system 106 transmits 906 the outgoing messages for its partitions. The worker system 106 then stores 908 the incoming messages for its recovering partitions.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for executing a confined recovery in a distributed computing system having a plurality of worker systems, the worker systems executing a computation in a plurality of supersteps, the worker systems having a plurality of partitions executing a defined function during the supersteps that exchange messages with partitions of other worker systems, the method comprising:

identifying a failed worker system from the plurality of worker systems, wherein the failed worker system failed to execute during a current superstep and lost exchanged messages;

determining states of the partitions of the worker systems during supersteps preceding the current superstep;

determining, responsive to the determination of the states, a recovery initiation superstep preceding the current superstep in which all messages for the recovery initiation superstep are available;

determining a recovery set of partitions for which messages in supersteps after the recovery initiation superstep are not available;

assigning each partition in the recovery set of partitions to a recovery worker system from a set of recovery worker systems configured to process the partition, wherein the set of recovery worker systems includes a proper subset of the plurality of worker systems;

determining messaging worker systems responsible for sending the messages in supersteps after the recovery initiation superstep that are not available, the messaging worker systems being a proper subset of the plurality of worker systems and being different than the recovery worker systems;

instructing the recovery worker systems to execute the defined function for the partitions in the recovery set starting at the recovery initiation superstep to recover the lost exchanged messages; and instructing the messaging worker systems to transmit the messages in supersteps after the recovery initiation superstep that are not available to the recovery work systems for use in processing the recovery set of partitions.

2. The computer-implemented method of claim 1, wherein the messages transmitted by the messaging worker systems are stored in a persistent storage.

3. The computer-implemented method of claim 1, further comprising:

assigning partitions of the failed worker system to at least one of the plurality of worker systems that has not failed.

4. The computer-implemented method of claim 1, wherein determining states of the partitions of the worker systems comprises:

determining whether a worker system has access to a complete set of incoming messages for a partition at a superstep, the complete set of incoming messages to be processed at the superstep.

5. The computer-implemented method of claim 1, wherein determining states of the partitions of the worker systems comprises:

determining whether a worker system has access to a complete set of outgoing messages for a partition at a superstep, the complete set of outgoing messages to be transmitted at the superstep.

6. The computer-implemented method of claim 1, further comprising:

receiving a plurality of status messages from the plurality of worker systems, a status message from a worker system indicating whether the worker system successfully transmitted its outgoing messages;

creating a group status message indicating whether each of the plurality of worker systems succeeded in transmitting its outgoing messages; and transmitting the group status message to each of the plurality of worker systems.

7. A non-transitory computer-readable storage medium storing executable computer program instructions for executing a confined recovery in a distributed computing system having a plurality of worker systems, the worker systems executing a computation in a plurality of supersteps, the worker systems having a plurality of partitions executing a defined function during the supersteps that exchange messages with partitions of other worker systems, the computer program instructions comprising instructions for:

identifying a failed worker system from the plurality of worker systems, wherein the failed worker system failed to execute during a current superstep and lost exchanged messages;

determining states of the partitions of the worker systems during supersteps preceding the current superstep;

determining, responsive to the determination of the states, a recovery initiation superstep preceding the current superstep in which all messages for the recovery initiation superstep are available;

determining a recovery set of partitions for which messages in supersteps after the recovery initiation superstep are not available;

assigning each partition in the recovery set of partitions to a recovery worker system from a set of recovery worker systems configured to process the partition, wherein the set of recovery worker systems includes a proper subset of the plurality of worker systems;

determining messaging worker systems responsible for sending the messages in supersteps after the recovery initiation superstep that are not available, the messaging worker systems being a proper subset of the plurality of worker systems and being different than the recovery worker systems;

instructing the recovery worker systems to execute the defined function for the partitions in the recovery set starting at the recovery initiation superstep to recover the lost exchanged messages; and instructing the messaging worker systems to transmit the messages in supersteps after the recovery initiation superstep that are not available to the recovery work systems for use in processing the recovery set of partitions.

8. The computer-readable storage medium of claim 7, wherein the messages transmitted by the messaging worker systems are stored in a persistent storage.

9. The computer-readable storage medium of claim 7, further comprising instructions for:

assigning partitions of the failed worker system to at least one of the plurality of worker systems that has not failed.

10. The computer-readable storage medium of claim 7, wherein determining states of the partitions of the worker systems comprises:

determining whether a worker system has access to a complete set of incoming messages for a partition at a superstep, the complete set of incoming messages to be processed at the superstep.

11. The computer-readable storage medium of claim 7, wherein determining states of the partitions of the worker systems comprises:

determining whether a worker system has access to a complete set of outgoing messages for a partition at a superstep, the complete set of outgoing messages to be transmitted at the superstep.

12. The computer-readable storage medium claim 7, further comprising instructions for:

receiving a plurality of status messages from the plurality of worker systems, a status message from a worker system indicating whether the worker system successfully transmitted its outgoing messages;

creating a group status message indicating whether each of the plurality of worker systems succeeded in transmitting its outgoing messages; and transmitting the group status message to each of the plurality of worker systems.

13. A computer system for executing a confined recovery in a distributed computing system having a plurality of worker systems, the worker systems executing a computation in a plurality of supersteps, the worker systems having a plurality of partitions executing a defined function during the supersteps that exchange messages with partitions of other worker systems, the computer system comprising:

a computer-readable medium storing executable program instructions comprising instructions for:

identifying a failed worker system from the plurality of worker systems, wherein the failed worker system failed to execute during a current superstep and lost exchanged messages;

determining states of the partitions of the worker systems during supersteps preceding the current superstep;

determining, responsive to the determination of the states, a recovery initiation superstep preceding the current superstep in which all messages for the recovery initiation superstep are available;

determining a recovery set of partitions for which messages in supersteps after the recovery initiation superstep are not available;

assigning each partition in the recovery set of partitions to a recovery worker system from a set of recovery worker systems configured to process the partition, wherein the set of recovery worker systems includes a proper subset of the plurality of worker systems;

determining messaging worker systems responsible for sending the messages in supersteps after the recovery initiation superstep that are not available, the messaging worker systems being a proper subset of the plurality of worker systems and being different than the recovery worker systems;

instructing the recovery worker systems to execute the defined function for the partitions in the recovery set starting at the recovery initiation superstep to recover the lost exchanged messages; and instructing the messaging worker systems to transmit the messages in supersteps after the recovery initiation superstep that are not available to the recovery work systems for use in processing the recovery set of partitions.

14. The computer system of claim 13, further comprising instructions for:

assigning partitions of the failed worker system to at least one of the plurality of worker systems that has not failed.

15. The computer system of claim 13, wherein determining states of the partitions of the worker systems comprises:

determining whether a worker system has access to a complete set of incoming messages for a partition at a superstep, the complete set of incoming messages to be processed at the superstep.

16. The computer system of claim 13, wherein determining states of the partitions of the worker systems comprises:

determining whether a worker system has access to a complete set of outgoing messages for a partition at a superstep, the complete set of outgoing messages to be transmitted at the superstep.

17. The computer system of claim 13, further comprising instructions for:

receiving a plurality of status messages from the plurality of worker systems, a status message from a worker system indicating whether the worker system successfully transmitted its outgoing messages;

creating a group status message indicating whether each of the plurality of worker systems succeeded in transmitting its outgoing messages; and transmitting the group status message to each of the plurality of worker systems worker systems that has not failed.

* * * * *